H. E. HOGUE.
CRANK HANGER.
APPLICATION FILED NOV. 12, 1917.
1,268,351.
Patented June 4, 1918.
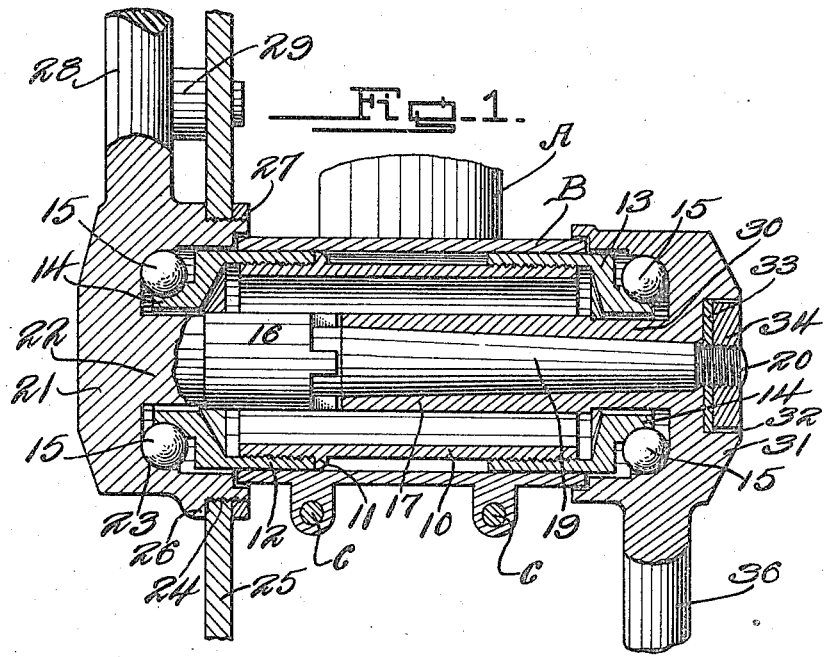
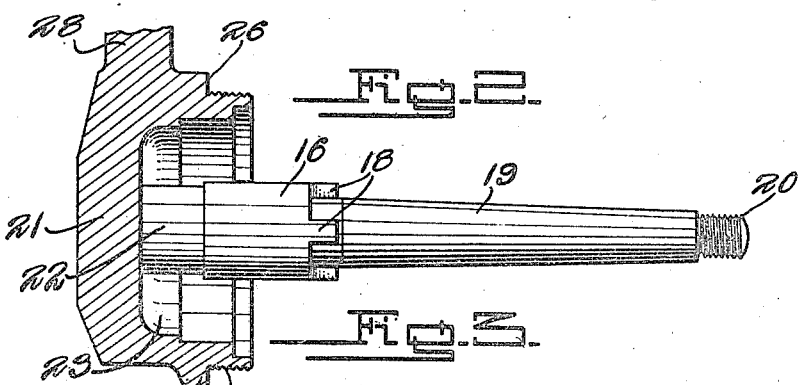
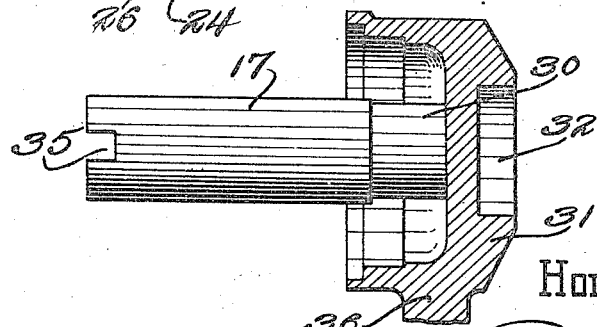
Inventor
Homer E. Hogue.
By Lancaster and Allwine
Attorneys

UNITED STATES PATENT OFFICE.

HOMER E. HOGUE, OF VENICE, CALIFORNIA.

CRANK-HANGER.

1,268,351.  Specification of Letters Patent.  Patented June 4, 1918.

Application filed November 12, 1917. Serial No. 201,568.

*To all whom it may concern:*

Be it known that I, HOMER E. HOGUE, a citizen of the United States, and a resident of Venice, in the county of Los Angeles and State of California, have invented certain new and useful Improvements in Crank-Hangers, of which the following is a specification.

The present invention relates to crank hangers, and more particularly to that type adapted for use in bicycle and similar constructions.

The object of the present invention is to provide a crank hanger having the bearing surfaces thereof spaced relatively wide apart and outwardly of the plane of the front wheel; to provide a construction wherein no cones are mounted upon the crank shaft; to provide a crank shaft which comprises but two parts adapted to be interfitted between the bearings; to provide a crank hanger and shaft which comprises relatively few parts capable of being quickly and easily assembled and separated; to provide a crank hanger which may not be easily broken by side strain, and which cannot easily wear loose; and to provide a construction of crank hanger embodying the novel features of this invention and which is of the same exterior dimensions as the crank hangers now commonly employed and which may be easily fitted into the clamping bracket of bicycle frames without altering the size or construction of the same.

The above, and various other objects and advantages of this invention will be in part described, and in part understood, from the following detailed description of the present preferred embodiment, the same being illustrated in the accompanying drawing, wherein Figure 1 is a longitudinal section through a crank hanger constructed according to the present invention.

Fig. 2 is a detail side elevation, partly in section of one end of the crank shaft.

Fig. 3 is a similar view of the opposite end of the crank shaft.

Referring to the drawing, A designates a portion of a bicycle frame of ordinary construction and which has as a part thereof the cylindrical clamping bracket B split longitudinally at its lower side and adapted to be drawn into binding engagement with the crank hanger by means of binding screws C.

The crank hanger comprises a spacer 10 in the form of a tubular body externally threaded at opposite ends and provided at the inner end of one of its threaded portions with an outstanding annular shoulder 11. Screw-threaded upon the opposite ends of the spacer 10 are cones 12 and 13, the same being in the form of caps and having annular set or reduced portions 14 on their outer ends with annular grooves therein forming raceways for the reception of ball-bearings 15. The cone 12 is adapted to be turned up against the shoulder 11 and to be locked and held thereby in fixed relation to the spacer 10. The other cone 13 is adapted to be turned upon the end of the spacer 10 to adjust the cone 13 toward and from the cone 12.

The spacer or body 10 together with its cones 12 and 13 is adapted to be fitted in the cylindrical brackets B of the bicycle frame and to be clamped therein upon the tightening of the bolt C. The bracket B when clamped secures the cones 12 and 13 in adjusted position.

The supporting body thus described is provided with a crank shaft, the same comprising independent sections 16 and 17. As shown in Fig. 2, the crank shaft section 16 comprises a relatively short cylindrical portion terminating at its inner end in a circular row of teeth 18 projecting from the inner end of the cylindrical portion 16, and which is also provided with a tapering end beyond the teeth 18 which terminates in a further reduced externally threaded stem 19. The outer end of the crank shaft section 16 has preferably integrally formed thereon an outer cone cap 21, and the shaft 16 is preferably provided with a reduced neck or connecting portion 22 between the outer end of the shaft and the integral cone cap 21. The cap 21 is provided therein with an annular raceway 23 adapted to receive the ball bearings 15 therein and formed to oppose the raceway 14 of the adjacent inner cone 12. The inner wall of the cap 21 is stepped or counter-bored to freely and adjustably receive the adjacent end of one of the cones, such as the cone 12 therein, and to also receive the adjacent end of the bracket B, as shown in Fig 1.

The outer cone cap 21 is provided with an annular external sprocket receiving portion 24 upon which a sprocket 25 is fitted, the latter being held in position by an annular shoulder 26 on the inner end of said portion 24 and by a lock ring 27 carried upon the outer extremity of the sprocket receiving portion 24. Radially projecting from one side of the cap 21 is a crank arm 28, and which may be provided upon its inner side with a lug or projection 29 adapted to be secured to the sprocket wheel 25 for reinforcing the same.

The section 17 of the crank shaft, as shown in Fig. 3, comprises a relatively long body part having a tapering bore adapted to receive the tapering end 19 of the other crank shaft section 16. The tapering bore of the section 17 extends through the neck 30 of the section and through the integral cone cap 31 carried upon the outer end of the section 17. The threaded stem 20 projects into a counter-sink 32 formed in the outer side of the cap 31 and is adapted to receive therein a binding washer 33 and a lock nut 34. The nut 34 is adapted to hold the shaft sections 16 and 17 in interfitting relation. The inner end of the shaft section 17 is provided with recesses or notches 35 adapted to receive the teeth 18 therein for holding the sections 16 and 17 from relative turning movement. The cap 31 is provided with a crank arm 36 adapted to extend in an opposite direction from that in which the crank arm 28 extends. The cap 31 is substantially of the same construction as that of the cap 21 and is adapted to house the adjacent ball bearings 15 and to fit over the cone 13 and the adjacent end of the bracket B. The crank shaft is provided with the reduced necks 22 and 30 for passage through the cones 12 and 13 to clear the same, and also to admit of a limited vibration of the crank shaft upon the wearing of the bearings 15. Whereupon the bearings and other parts in surface contact may be taken up by the adjustment of but one of the cones, such as the cone 13, and as the sprocket 25 is mounted upon the inner end of the cap 21, the sprocket lies in a plane which intersects the axis of the hanger between the opposite end bearings 15, the bearings being so arranged in relatively wide apart position to reduce the leverage and friction placed upon the bearings by the mounting of the sprocket wheel outwardly of one of the bearings.

It is of course understood that various changes and modifications may be made in the details of construction and design of the above specifically described embodiment of this invention without departing from the spirit thereof, such changes and modifications being restricted only by the scope of the following claims.

I claim:

1. In a crank hanger, the combination of a spacer, cones mounted on the opposite ends of the spacer and being adjustable toward and from each other, a two-part interlocked crank shaft adapted to be fitted in the opposite ends of the spacer and through said cones and provided with integral caps upon their outer ends adapted to engage over the spacer and over said cones, bearings carried between the cones and the caps, one part of the crank shaft having a tapering spindle and the other part having a correspondingly tapered bore adapted to receive the spindle, and adjustable means for binding the parts together.

2. In a crank hanger, the combination of a spacer, cones mounted on the opposite ends of the spacer and being adjustable toward and from each other, a two-part interlocked crank shaft adapted to be fitted in the opposite ends of the spacer and through said cones and provided with integral caps upon their outer ends adapted to engage over the spacer and over said cones, and bearings arranged between the cones and the caps, said parts of the crank shaft being reduced in diameter opposite the cones to admit free vibration of the crank shaft upon undue wear and lack of proper adjustment of the bearings and raceways for preventing injury to the cones by direct contact of the crank shaft.

3. In a crank hanger, the combination of a spacer, a cone detachably mounted on one end of the spacer, a second cone adjustably mounted on the opposite end of the spacer, said cones having exterior raceways adapted to receive ball bearings, caps fitting over the cones and provided with interior raceways adapted to receive said balls, a shaft section carried upon one of the caps and projecting into one end of the spacer and tapering at said end, a second shaft section carried upon the other cap and projecting into the other end of the spacer and having a tapering bore adapted to receive the tapering end of the first shaft section, a binding nut carried upon the end of said first shaft section and adapted to bear against the cap of the other shaft section, and crank arms extending in opposite direction from the caps.

4. In a crank hanger, the combination of a spacer, cones threaded upon the opposite ends of the spacer and adapted to fit therewith into the bracket of a bicycle frame, a pair of crank shaft sections projecting into the opposite ends of the spacer and provided with integral caps upon their outer ends adapted to close the ends of the spacer and to engage over the ends of the brackets, a shaft section carried by one of the caps and provided with a tapering inner end and clutch piece at the base of said tapering end, a second shaft section carried by the other cap and provided with a tapering bore adapted to receive the tapering end of the first section and having notches for the reception of said clutch piece, said second cap provided with a depression in its outer side for the reception of the reduced end of the first shaft section, a locking nut arranged upon said reduced end of the first shaft section and seated in said depression and crank arms projecting in opposite direction from said caps.

HOMER E. HOGUE.

Copies of this patent may be obtained for five cents each, by addressing the "Commissioner of Patents, Washington, D. C."